United States Patent [19]
Atsumi et al.

[11] Patent Number: 5,442,165
[45] Date of Patent: Aug. 15, 1995

[54] SECURE IC CARD SYSTEM WITH REUSABLE PROTOTYPE IC CARD

[75] Inventors: Shiro Atsumi; Toshinari Kondo; Yoshihiro Shona, all of Tokyo, Japan

[73] Assignee: Oki Electric Industry Co., Ltd., Tokyo, Japan

[21] Appl. No.: 136,038

[22] Filed: Oct. 14, 1993

[30] Foreign Application Priority Data

Oct. 15, 1992 [JP] Japan .................. 4-277256

[51] Int. Cl.⁶ .................. G06K 19/06; G06K 5/00
[52] U.S. Cl. .................. 235/492; 235/380; 902/26; 902/29
[58] Field of Search .......... 235/492, 441, 438, 380, 235/382, 382.5; 902/26, 29

[56] References Cited

U.S. PATENT DOCUMENTS

| | | | |
|---|---|---|---|
| 4,810,862 | 3/1989 | Nakano et al. | 235/380 |
| 4,855,578 | 8/1989 | Hirokawa et al. | 235/380 |
| 5,039,850 | 8/1991 | Yamaguchi | 235/492 |
| 5,126,541 | 6/1992 | Shinagawa | 235/438 |
| 5,206,938 | 4/1993 | Fujioka | 235/382 X |

FOREIGN PATENT DOCUMENTS 8201610  5/1982  WIPO .................. 235/380

Primary Examiner—Donald Hajec
Assistant Examiner—Mark Tremblay
Attorney, Agent, or Firm—Wenderoth, Lind & Ponack

[57] ABSTRACT

An IC card system uses a IC card and one or more production IC cards. The prototype card is programmed to execute standard read/write commands, and an initialize command that returns the card to an initial state. The prototype IC card, which can be issued, initialized, and reissued repeatedly, is used for testing purposes during the development of system software. Production IC cards are programmed to execute the standard read/write commands, and a version read command that reads out a version number distinguishing a production IC card from the prototype IC card. Production IC cards are not programmed to execute the initialize command.

21 Claims, 5 Drawing Sheets

SECURE IC CARD SYSTEM WITH REUSABLE PROTOTYPE IC CARD

BACKGROUND OF THE INVENTION

This invention relates to an IC card system such as a bank card system, more particularly to an IC card system that is secure, yet can be developed without spoiling a large number of cards.

Wallet-size cards, similar in appearance to ordinary credit cards but having embedded integrated circuits (ICs), are issued by institutions such as banks as a convenient means of managing financial and other data. Popularly known as "smart cards," these cards will be referred to herein as IC cards. An IC card system comprises not only the IC cards themselves but also various software. The software includes, for example, an issuing program used in issuing the cards to end users, and application programs used to process the cards when they are inserted in card-handling devices such as automatic teller machines.

A feature of IC card systems is that they can be made extremely secure by protecting the cards with passwords, and by protecting certain data in the cards from alteration even by a person who knows the password. Typically, the cards are manufactured by one entity (the card manufacturer), then issued by another entity (the card issuer) to end users. In one conventional system, the card manufacturer programs the cards with a manufacturer's password known only to the card manufacturer and card issuer. Upon receiving a card from the card manufacturer, the card issuer changes the password to an issuer's password known only to the card issuer, stores certain issuer data and application data in the card, and sets protection bits that permanently prevent some of these data from being altered. When the card issuer issues the card to an end user, he stores further information in the card, such as the user's name, address, and personal identity number. Some of this information may also be permanently protected from alteration.

An end user cannot tamper with the data in his card because he does not know the issuer's password. If the card is stolen by a third party, that party cannot tamper with the card for the same reason. If the third party steals a card from the card manufacturer, he still cannot tamper with it because he does not know the manufacturer's password. The card manufacturer himself is unable to tamper with a card once the card issuer has changed the password. Furthermore, even if someone who knew the issuer's password were to use it to gain unauthorized access to an already-issued card, he would be unable to reissue the card to himself because of the permanent protection of data in the card. In this way an IC card can be made secure against virtually any kind of attack, whether it be by an end user, a third party, the card manufacturer, or an employee of the card-issuing institution.

A disadvantage of these security arrangements, however, is that the card issuer is forced to expend a large number of cards in the process of developing and debugging his software. This is particularly true when the software is developed through a trial-and-error process, which is often the case. Consider, for example, a card issuer who is developing an issuing program. He completes a first version of the program and tests it by issuing a first card to an imaginary end user. The card is then evaluated by checking that it contains correct data and works correctly with application software. If any deficiencies are found, the issuing program is modified, and the modified program is tested by issuing a second card. Even if no problems are found, additional cards are issued to test the program under different sets of issuing conditions.

This process is repeated until the issuing program has been completely developed, tested, and debugged. A new card is required for each test, because the permanent data protection applied when each card is issued prevents the card from being reused For another test. Each test accordingly spoils one card. As the program development process typically involves many tests, many cards must be sacrificed in this way.

SUMMARY OF THE INVENTION

It is accordingly an object of the present invention to enable IC card system software to be developed and tested without spoiling IC cards.

Another object of the invention is to maintain existing levels of security.

The invented IC card system uses a set of IC cards comprising a prototype IC card and one or more production IC cards. The prototype IC card is programmed to execute a standard set of commands for reading and writing data in the card, and an initialize command for initializing these data. During development of system software, the software can be tested by repeatedly issuing, initializing, and reissuing the prototype IC card.

Production IC cards are programmed to execute the same standard set of commands, and a version read command. The version read command reads out a version number distinguishing a production IC card from the prototype IC card. Production IC cards are not programmed to execute the initialize command. Production IC cards are personalized with end user data and distributed to end users.

DETAILED DESCRIPTION OF THE INVENTION

An embodiment of the present invention will be described with reference to the attached drawings. These drawings illustrate the invention but do not restrict its scope, which should be determined solely from the appended claims.

Figure 1:
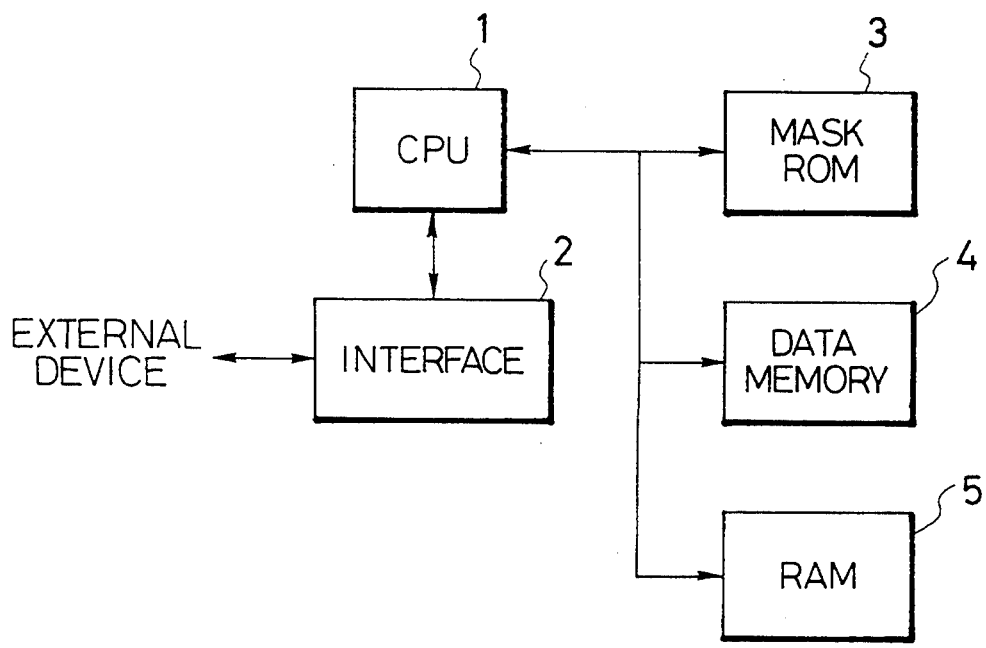
FIG. 1 is a block diagram of an integrated circuit in an IC card.

FIG. 1 is a block diagram of an integrated circuit that may be used in the invented IC card system. The circuit comprises a central processing unit (CPU) 1, an interface 2, a mask-programmable read-only memory (mask ROM) 3, a non-volathe data memory 4, and a volathe random-access memory (RAM) 5. The interface 2 enables the CPU 1 to communicate with an external card-handling device such as an automatic teller machine. The data memory 4 comprises, for example, so-called flash memory, or electrically-erasable programmable read-only memory (EEPROM). The RAM 5 is used as a work area during program execution. The circuit blocks in FIG. 1 are well known to those skilled in the art, so detailed descriptions thereof have been omitted.

IC cards containing the integrated circuit in FIG. 1 are supplied from a card manufacturer to a card issuer, who then issues them to end users. The card manufacturer may manufacture the integrated circuit himself, or he may obtain it from an IC manufacturer. In either case, the card manufacturer programs the mask ROM 3, e.g. by supplying the IC manufacturer with mask data. Once the IC is manufactured, it is physically impossible to alter the contents of the mask ROM 3. The contents of the data memory 4. in contrast, can be altered. The data memory 4 is programmed by both the card manufacturer and card issuer.

Figure 2:
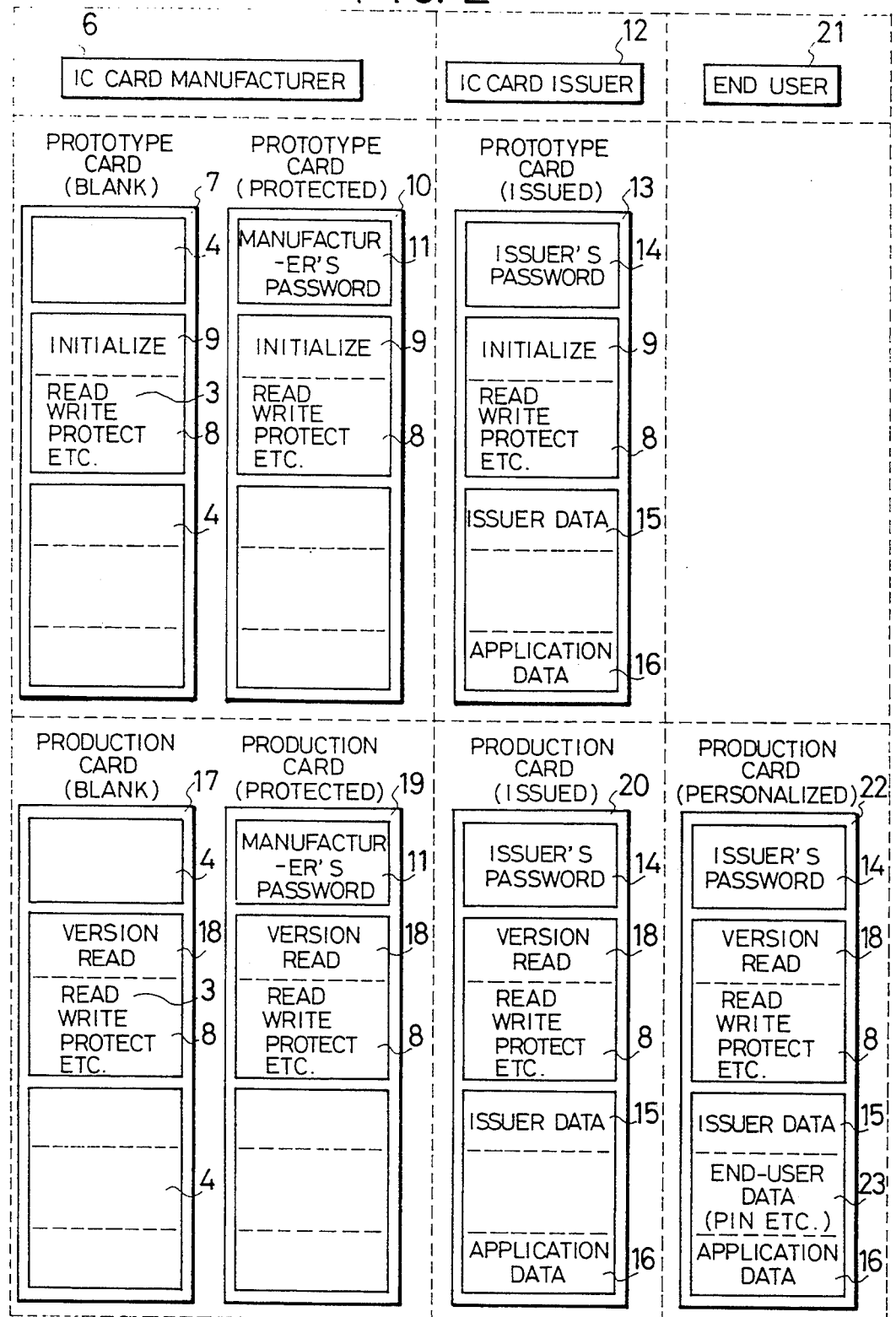
FIG. 2 illustrates prototype and production cards in various stages of programming.

FIG. 2 illustrates two types of IC cards in various stages of programming, indicating the contents of their mask-programmable ROM 3 and data memory 4. One of these types, illustrated at the top of FIG. 2, is a prototype card used by the card issuer during program development. The other type, illustrated at the bottom of FIG. 2, is a production card, which is distributed to end users.

When the card manufacturer 6 manufactures a prototype card, it is originally a blank prototype card 7. "Blank" means that the data memory 4 is in an initial state containing, for example, all-one data, or all-zero data. The mask ROM 3 of a blank prototype card 7 contains programs that execute a standard set of commands 8 comprising read, write, protect, and other commands. The read and write commands programmed into the mask ROM 3 can be used to read and write data in the data memory 4. The protect command can be used to protect specified data in the data memory 4 from further alteration by the write command. The mask ROM 3 also contains an initialize command program 9 that releases the protection see by the protect command and restores the data memory 4 to its initial state, erasing any data written by the write command.

Details of the programming of the above commands will be familiar to those skilled in the art. For example, the protect command can be programmed to write-protect specified areas of the data memory 4 by setting corresponding protection bits in the data memory 4. The write command may comprise a check routine that prevents the write command from (1) setting or clearing any protection bits; and (2) writing into a write-protected area, i.e. an area the protection bit of which is set. The initialize command 9 can erase the entire data memory 4, thereby also clearing the protection bits.

The write, protect, and initialize commands (and possibly other commands) are programmed so that they can only be executed by first entering a password. When entered, the password is, for example, stored in the RAM 5, and checked by comparison with a password value stored in the data memory 4. This password protection can be removed from the write command, and possibly from other commands, when the card is issued. In the blank prototype card 7, the password value stored in the data memory 4 is an initial all-zero or all-one value.

After manufacturing the blank prototype card 7, the card manufacturer 6 proceeds to protect it by changing the password, thereby converting the blank prototype card 7 to a protected prototype card 10. Specifically, the card manufacturer 6 enters the initial (all-zero or all-one) password, thereby gaining the right to execute the write command, then uses the write command to write a manufacturer's password 11 in the data memory 4. The manufacturer's password 11 is known to both the card manufacturer 6 and card issuer 12, but is kept secret from other parties.

When the card issuer 12 receives the protected prototype card 10 from the card manufacturer 6, he uses his issuing program to write data in the data memory 4, thereby converting the card to an issued prototype card 13. Specifically, the issuing program enters the manufacturer's password 11, thereby gaining the right to execute the write command. Next, the issuing program uses the write command to change the manufacturer's password 11 to an issuer's password 14 which is known only to the issuer. Then the issuing program writes issuer data 15 and application data 16 in the data memory 4, and uses the protect command to protect the password 14 and appropriate parts of the issuer data 15 and application data 16 from further alteration.

At this point the issued prototype card 13 has been issued to an imaginary end user whose name and other end-user data all have initial (all-zero or all-one) values. The card issuer 12 uses the issued prototype card 13 for test purposes, as described later. After testing is completed, the card issuer 12 orders a quantity of production cards from the card manufacturer 6.

A blank production card 17 is the same as a blank prototype card 7 except that in place of the initialize command 9, it has a version read command 18 which reads a version number. The version number is preferably a number stored in the mask ROM 3 that distinguishes the production card from a prototype card. Prototype cards have either a different version number, or no version number. For example, the version number can be embedded in the version read command program, which is lacking in prototype cards.

After manufacturing a blank production card 17, the card manufacturer 6 converts it to a protected production card 19 by writing the manufacturer's password 11, then ships it to the card issuer 12. Upon receiving a protected production card 19, the card issuer 12 promptly uses the issuing program to write the issuer's password 14, issuer data 15, and application data 16 in the data memory 4 and protect appropriate parts of these data from further alteration, thereby converting the card to an issued production card 20.

When the card issuer 12 transfers the card to an end user 21, he uses the issuing program again to convert the card to a personalized production card 22. Specifically, the issuing program now enters the issuer's password 14, then uses the write command to write end-user data 23 in the data memory 4. The end-user data 23 comprises, for example, the end user's name, address, and a personal identity number (PIN), this latter being a secret code known only to the card issuer 12 and end user 21. The issuing program may also protect appropriate parts of the end-user data 23 from alteration, remove password protection from the write command and possibly other commands as noted above, and substitute alternative forms of protection based on, for example, the end user's PIN. The end user 21 can now use the personalized production card 22 for its intended purpose, e.g. for conducting financial transactions.

Figure 3:
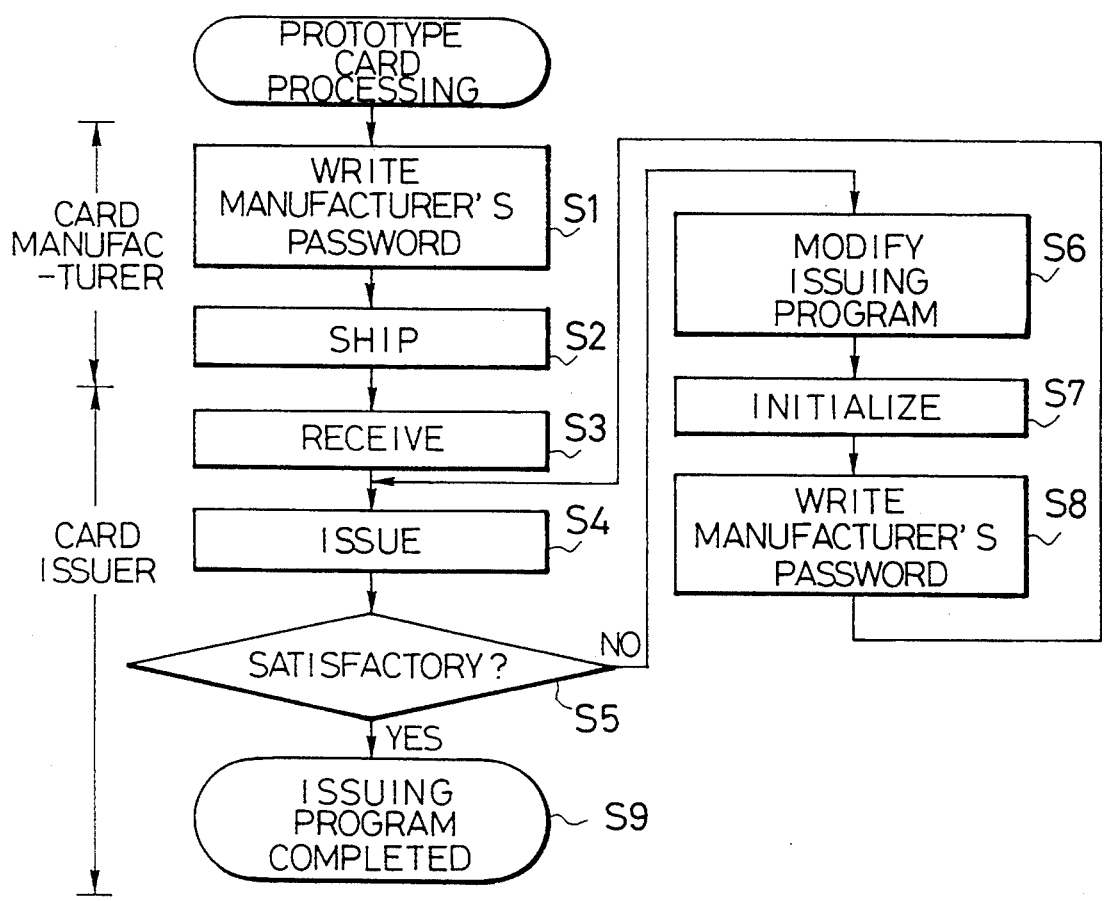
FIG. 3 is a flowchart illustrating the use of a prototype card to develop a card-issuing program.

The use of a prototype card in developing an issuing program is illustrated in FIG. 3. In step S1, the card manufacturer protects the prototype card by writing the manufacturer's password in it. In step S2, the card manufacturer ships the prototype card to the card issuer. In step S3, the card issuer receives delivery of the prototype card. In step S4, the card issuer issues the prototype card, using the issuing program which is under development. In step S5 the prototype card is tested and evaluated by, for example, inserting it in a card-testing device. If step S5 indicates that the issuing program needs to be modified, this is done in step S6, then the card is initialized in step S7, using the initialize command. In step S8 the card issuer enters the initial (all-zero or all-one) password value, then executes the write command to change the password to the manufacturer's password, thereby restoring the card to its state upon delivery in step S3.

The procedure now returns to step S4: the card is reissued, using the modified issuing program, then tested and evaluated again. The prototype card can be cycled through steps S4, S5, S6, S7, and S8 as many times as necessary until the issuing program has been completed, and has been thoroughly tested and debugged. When all tests are finished and a satisfactory result is obtained in step S5, then in step S9 the card issuer declares the issuing program completed.

The issuing program can accordingly be completely developed, tested, and debugged using only a single prototype card. It is not necessary to spoil large quantities of production cards as in the prior art.

Figure 4:
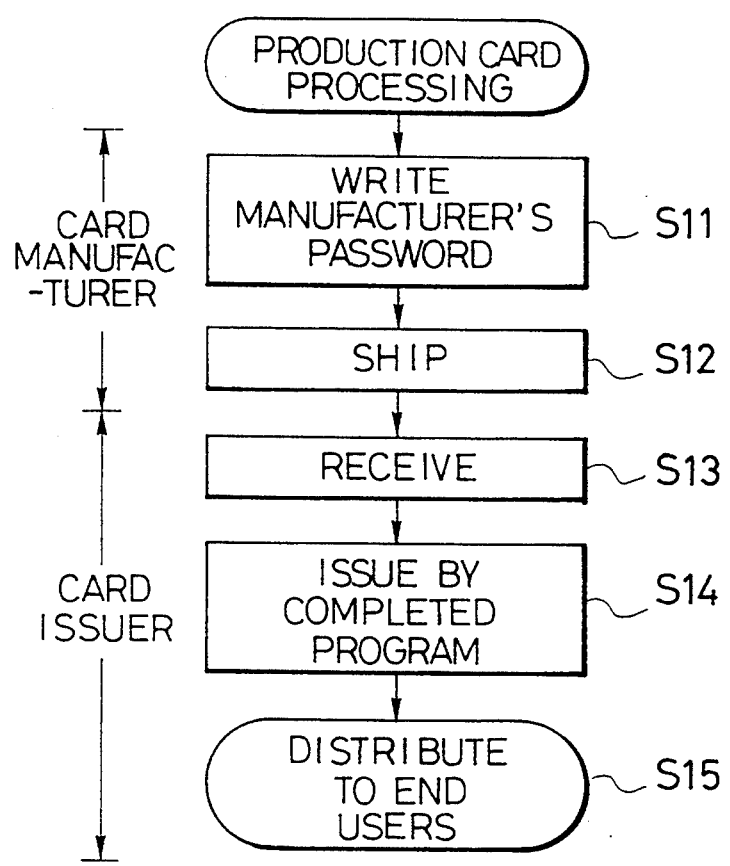
FIG. 4 is a flowchart illustrating the issuing of production cards.

FIG. 4 illustrates the issuing of a production card. In step S11, the card manufacturer protects the production card by writing the manufacturer's password. In step S12, the card manufacturer ships the production card to the card issuer, who receives delivery in step S13. In step S14, the card issuer issues the production card, using the completed issuing program, and personalizes it with end-user data. In step S15 the personalized card is delivered to the end user.

Figure 5:
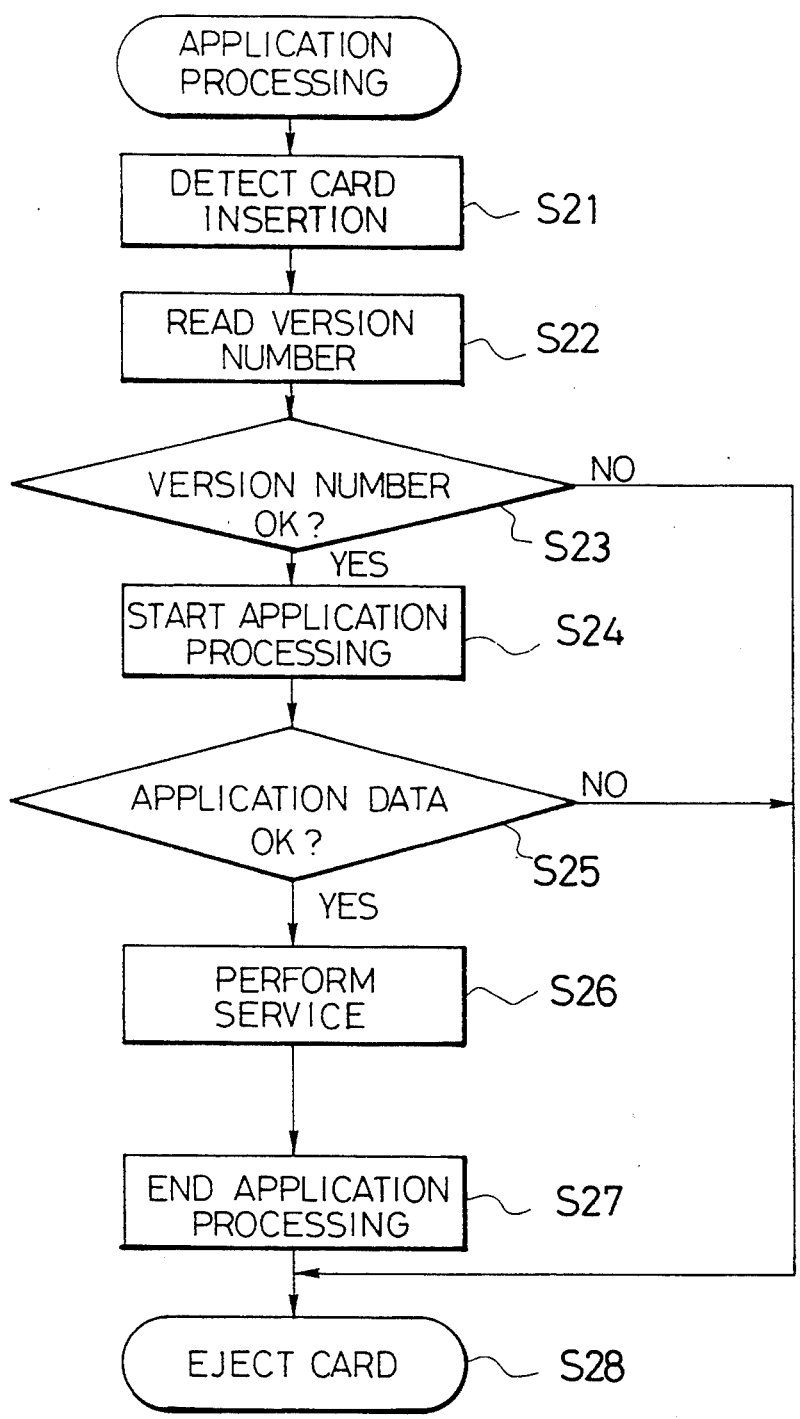
FIG. 5 is a flowchart illustrating the use of production cards by end users.

FIG. 5 illustrates the use of a personalized production card by the end user. In step S21, the end user inserts the card in a card-handling device at, for example, a bank, and the device detects that the card has been inserted. In step S22, a standard program in the device instructs the card to execute the version read command, thereby reading the version number from the card. In step S23, the version number is checked. If the version number is appropriate, in step S24 an application program is started. In step S25 the application program reads and checks application data stored in the card. If this check passes, in step S26 the application program performs the service it has been programmed to provide, such as carrying out a financial transaction. When this service is completed, in step S27 the application program ends, and in step S28 the card is ejected.

The process in FIG. 5 has several built-in safeguards. First, if the card is not programmed to execute the version read command (e.g., if the card is a prototype card) the version check in step S23 will obviously fall. Failure of the check in step S23 causes a jump to step S28, ejecting the card. Second, if the version number recorded in the card is inappropriate, the result in step S23 will again be negative and the card will again be ejected. Third, if the application data read in slop S25 are inappropriate (for example, if the card was issued by a different issuer), the application program will jump to step S28, once again ejecting the card.

The invented card system accordingly provides the same security features as in the prior art. A production card is protected first by the manufacturer's password, then by the issuer's password, and also by the permanent write protection applied to various data when the card issued, which prevents the card From being reissued.

A prototype card is even more strongly protected, because it lacks the version read command. When inserted in a card-handling device, a prototype card will fail the version check in step S23 in FIG. 5 and be ejected before any application processing can begin. Accordingly, even if someone obtains a blank prototype card 7 that is not protected by a password, although he can tamper with the contents of the card to his heart's content, he cannot make any use of the card. The same applies to someone who steals a protected prototype card 10 or issued prototype card 13.

The IC card system described above is only one of many possible embodiments of the invention. It can be modified in numerous ways. For example:

The version number was described as stored in the mask ROM 3, where it cannot be altered. Since prototype cards lack the version read command, however, it is possible to store the version number in the data memory 4. This provides additional flexibility, since it permits the card issuer to write different version numbers without having to order changes in mask-ROM data.

If the version number is stored in the mask ROM 3, it is possible to provide the prototype card with a version read command without compromising the security of the system, as long as prototype cards and production cards have different version numbers. If inserted in a card-handling device, a prototype card will still fail the version check in step S23 in FIG. 5, this check being adapted to reject cards having prototype version numbers.

The initialize command was described as restoring a prototype card to the blank state, so that the issuer had to write the manufacturer's password to return the card to its condition upon delivery. An alternative scheme is to have the initialize command write the manufacturer's password. For further security, the manufacturer can use two different passwords, one for prototype cards and one for production cards.

The prototype card can be used not only during development of the issuing program, but also during development of application programs and other system software.

Those skilled in the art will recognize that still further modifications can be made without departing from the scope of the invention as claimed below.

What is claimed is:

1. A method of developing, issuing, and using IC cards, comprising the steps of:

manufacturing a prototype IC card programmed to execute a standard set of read/write commands and an initialize command;

writing a manufacturer's first password in said prototype IC card;

delivering said prototype IC card to a card issuer and informing said card issuer of said manufacturer's first password;

developing a card-issuing program;

writing an issuer's password known only to said card issuer, together with issuer data and application data, in said prototype IC card, using said card-issuing program;

evaluating said prototype IC card and said card-issuing program;

initializing said prototype IC card with said initializing command, thereby erasing said issuer's password, said issuer data, and said application data from said prototype IC card;

modifying said card-issuing program;

repeating the preceding steps of writing, evaluating, initializing, and modifying until said card-issuing program is satisfactory;

manufacturing production IC cards programmed to execute said standard set of read/write command, and to execute a version read command for reading a version number distinguishing said production IC cards from said prototype IC card, but not to execute said initialized command;

writing a manufacturer's second password in said production IC cards;

delivering said production IC cards to said card issuer and informing said card issuer of said manufacturer's second password;

writing said issuer's password, together with said issuer data and application data, in said production IC cards, using said card-issuing program;

personalizing said production IC cares with end-user data;

distributing said production IC cards to end users; and checking said version number, by executing said version read command, when said production IC cards are used by said end users.

2. The method of claim 1, comprising the further step of protecting at least part of said issuer's password, said issuer data, and said application data from alteration except by said initialize command.

3. The method of claim 1, wherein said issuer's password replaces said manufacturer's first password and said manufacturer's second password.

4. The method of claim 1, wherein the step of writing a manufacturer's first password in said prototype IC card is performed both before the step of delivering said prototype IC card and after the step of initializing said prototype IC card.

5. The method of claim 1, wherein the step of initializing said prototype IC card comprises writing of said manufacturer's first password in said prototype IC card.

6. The method of claim 1, wherein said prototype IC card is not programmed to execute said version read command.

7. The method of claim 1, wherein said prototype IC card is programmed to execute said version read command, but has a version number different from the version numbers of production IC cards.

8. The method of claim 1, wherein said manufacturer's first password and said manufacturer's second password are different.

9. The method of claim 1, wherein said manufacturer's first password and said manufacturer's second password are identical.

10. A set of IC cards, comprising:
a prototype IC card storing: a manufacturer's password, a standard set of commands for writing an issuer's password and for erasing said manufacturer's password and for writing application data in said prototype IC card, and an initialize command for erasing said issuer's password and said application data; and
at least one production IC card for storing: a manufacturer's password, a standard set of commands for writing an issuer's password and for erasing said manufacturer's password and for writing application data in said production IC card, a version number for distinguishing said production IC card from said prototype IC card, and a version read command, for reading said version number;
wherein said standard set of commands stored in said prototype IC card and said standard set of commands stored in said production IC card are substantially identical; and wherein said initialize command is not stored in said production IC card.

11. The set of IC cards of claim 10, wherein said standard set of commands comprises a command for preventing alteration of specified data in said prototype IC card and said production IC card;
and wherein said initialize command in said prototype IC card capable of said alteration of specified data in said prototype IC card is capable of overcoming said command to preventing alteration of specified data.

12. The set of IC cards of claim 10, wherein said prototype card does not store at least one of said version number and said version read command.

13. The set of IC cards of claim 10, wherein execution of said initialize command and at least some of said standard set of commands is initially conditional on entry of a correct password.

14. The set of IC cards of claim 13, wherein said initialize command initializes said issuer's password to a non-secret value.

15. The set of IC cards of claim 13, wherein said initialize command initializes said issuer's password to said manufacturer's password.

16. The set of IC cards of claim 10, wherein said standard set of commands of each of said prototype IC card and said production IC card is stored in a mask-programmable read-only memory.

17. The set of IC cards of claim 10, wherein said initialize command is stored in a mask-programmable read-only memory.

18. The set of IC cards of claim 10, wherein said version read command is stored in a mask-programmable read-only memory.

19. The set of IC cards of claim 10, wherein said version number is stored in a mask-programmable read-only memory.

20. The set of IC cards of claim 10, wherein said manufacturer's password and said issuer's password are stored in a non-volathe memory which can be electrically written and rewritten.

21. A set of IC cards, comprising:
a prototype IC card programmed to execute a standard set of commands for reading and writing data in said prototype IC card, and an initialize command for initializing said data; and
at least one production IC card programmed to execute said standard set of commands, which read and write data in said production IC card, and programmed to execute a version read command, which reads a version number distinguishing said production IC card from said prototype IC card, but not programmed to execute said initialize command;
wherein execution of said initialize command and at least some of said standard set of commands is initially conditional on entry of a correct password; and
wherein said initialize command initializes said password to a preselected value.

* * * * *